(12) United States Patent
Liou (10) Patent No.: US 11,174,937 B2
(45) Date of Patent: Nov. 16, 2021

(54) SPEED REDUCER COOLING FINS AND METHOD OF MANUFACTURING

(71) Applicant: ABB Schweiz AG, Baden (CH)

(72) Inventor: Joe J. Liou, Windsor, CT (US)

(73) Assignee: ABB Schweiz AG, Baden (CH)

( * ) Notice: Subject to any disclaimer, the term of this patent is extended or adjusted under 35 U.S.C. 154(b) by 39 days.

(21) Appl. No.: 16/579,211

(22) Filed: Sep. 23, 2019

(65) Prior Publication Data

US 2021/0088123 A1   Mar. 25, 2021

(51) Int. Cl.

| | |
|---|---|
| *F16H 57/04* | (2010.01) |
| *F16H 57/031* | (2012.01) |
| *F28F 3/04* | (2006.01) |
| *B33Y 10/00* | (2015.01) |
| *B33Y 80/00* | (2015.01) |
| *B33Y 70/00* | (2020.01) |
| *F16H 57/02* | (2012.01) |

(52) U.S. Cl.
CPC ....... *F16H 57/0416* (2013.01); *F16H 57/031* (2013.01); *F28F 3/04* (2013.01); *B33Y 10/00* (2014.12); *B33Y 70/00* (2014.12); *B33Y 80/00* (2014.12); *F16H 2057/02073* (2013.01)

(58) Field of Classification Search
CPC ..... B33Y 10/00; B33Y 70/00; F16H 57/0416; F16H 57/031; F28F 3/04; F28F 3/025; F28F 21/084; F28D 9/0062; B21D 53/022; B05C 19/04; B22F 7/02
See application file for complete search history.

(56) References Cited

U.S. PATENT DOCUMENTS

| | | | |
|---|---|---|---|
| 1,991,618 A | 2/1935 | Lyman | |
| 2,583,751 A | 1/1952 | Schmitter | |
| 3,191,418 A * | 6/1965 | Modine | B21D 53/022 |
| | | | 72/187 |
| 3,476,177 A | 11/1969 | Potzi | |
| 3,550,678 A | 12/1970 | Pfouts | |
| 4,022,272 A | 5/1977 | Miller | |
| 5,193,415 A | 3/1993 | Massel | |
| 5,816,320 A | 10/1998 | Arnold et al. | |
| 6,415,855 B2 | 7/2002 | Gerard et al. | |
| 6,425,293 B1 | 7/2002 | Woodroffe et al. | |
| 6,691,831 B1 | 2/2004 | Furuya | |
| 6,919,504 B2 | 7/2005 | McCutcheon et al. | |
| 8,410,350 B2 | 4/2013 | Corrales et al. | |
| 8,833,193 B2 | 9/2014 | Straub et al. | |
| 8,967,334 B2 | 3/2015 | Straub et al. | |
| 8,973,458 B2 | 3/2015 | Straub et al. | |
| 9,062,754 B2 | 6/2015 | Straub et al. | |
| 9,599,406 B2 | 3/2017 | Tietyen et al. | |
| 9,856,759 B2 | 1/2018 | Schiedig et al. | |

(Continued)

FOREIGN PATENT DOCUMENTS

| | | |
|---|---|---|
| DE | 102004022863 | 12/2005 |
| JP | 3757765 | 3/2006 |

(Continued)

*Primary Examiner* — Vinh Luong (74) *Attorney, Agent, or Firm* — Leydig, Voit & Mayer, Ltd.

(57) ABSTRACT

A speed reducer system includes a speed reducer having a housing. The housing includes an outer surface. The speed reducer system also includes a plurality of cooling fins added to the outer surface via a metal additive manufacturing process.

24 Claims, 13 Drawing Sheets

(56) References Cited

U.S. PATENT DOCUMENTS

| | | | |
|---|---|---|---|
| 9,951,859 B2 | 4/2018 | Becka | |
| 10,058,008 B2 | 8/2018 | Yang | |
| 10,260,817 B2 | 4/2019 | Fetzer et al. | |
| 10,458,534 B1* | 10/2019 | Liou | F16H 57/0415 |
| 10,578,205 B2* | 3/2020 | Rakuff | F04D 29/441 |
| 2005/0151554 A1 | 7/2005 | Rae et al. | |
| 2012/0024097 A1* | 2/2012 | Strau | F16C 33/664 |
| | | | 74/467 |
| 2015/0289850 A1 | 10/2015 | Lewis et al. | |
| 2015/0296658 A1* | 10/2015 | Kimura | F16H 57/0416 |
| | | | 361/697 |
| 2018/0015539 A1* | 1/2018 | Versluys | B33Y 80/00 |
| 2018/0299210 A1 | 10/2018 | Ronacher | |
| 2018/0345353 A1* | 12/2018 | Martin | B33Y 80/00 |
| 2019/0301816 A1* | 10/2019 | Yun | F28F 7/02 |
| 2019/0313878 A1* | 10/2019 | Dries | B29C 64/118 |
| 2020/0308986 A1* | 10/2020 | Slayter | F01D 21/045 |

FOREIGN PATENT DOCUMENTS

| | | |
|---|---|---|
| WO | 91/04427 | 4/1991 |
| WO | WO 2015109214 A1 * | 7/2015 |

* cited by examiner

SPEED REDUCER COOLING FINS AND METHOD OF MANUFACTURING

TECHNICAL FIELD

The present application relates generally to speed reducer systems, and more particularly, but not exclusively, to a speed reducer having cooling fins and method for manufacturing the same.

BACKGROUND

Figure 1:
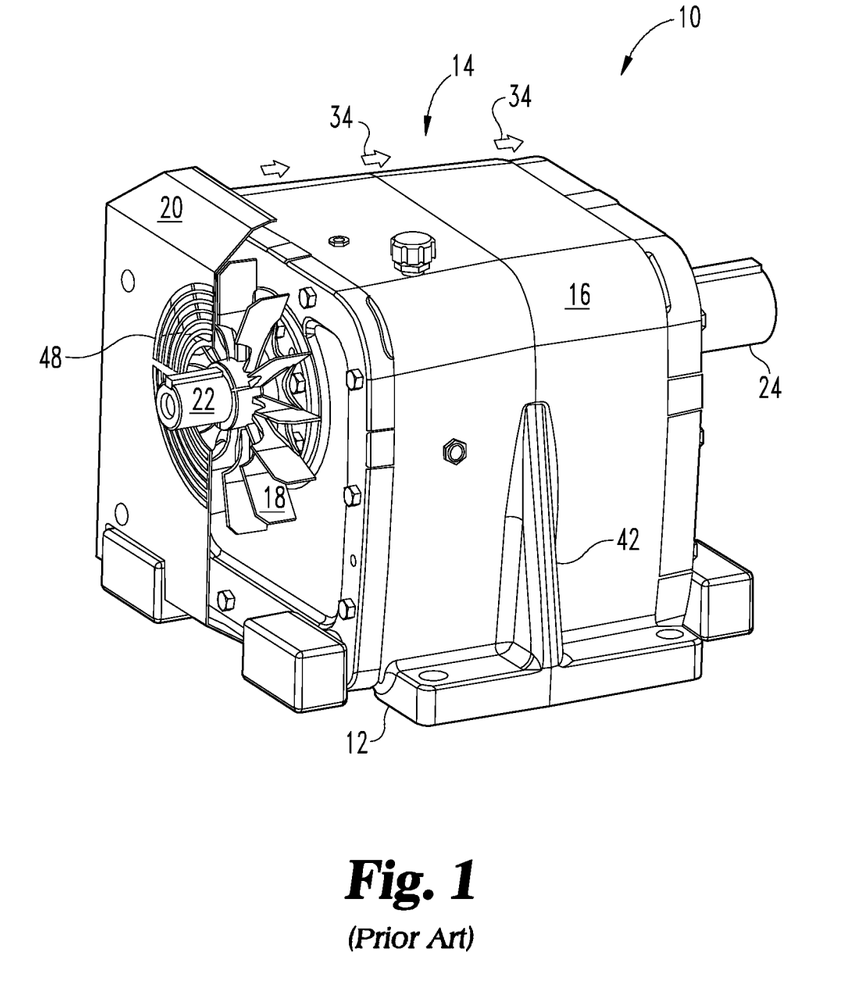
FIG. 1 depicts a perspective view illustrating some aspects of a non-limiting example of a speed reducer system of the prior art.
Figure 2:
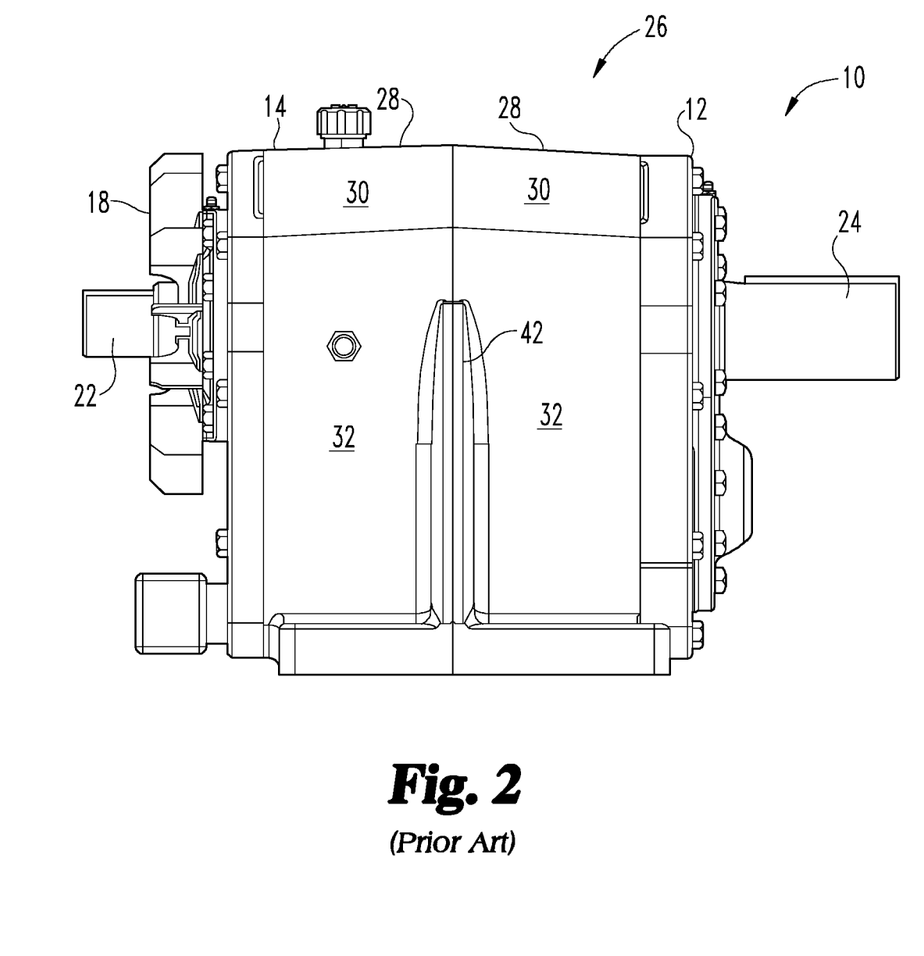
FIG. 2 illustrates a side view of the speed reducer system of FIG. 1.
Figure 3:
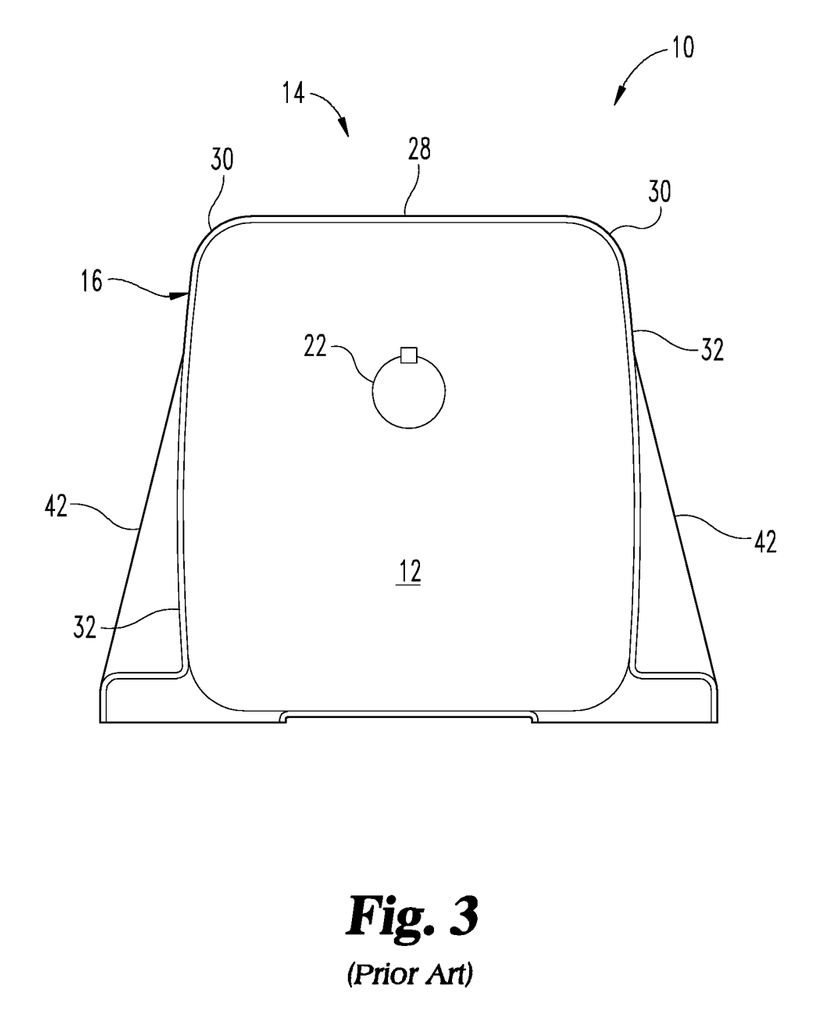
FIG. 3 schematically illustrates an end view of the speed reducer system of FIG. 1.
Figure 4:
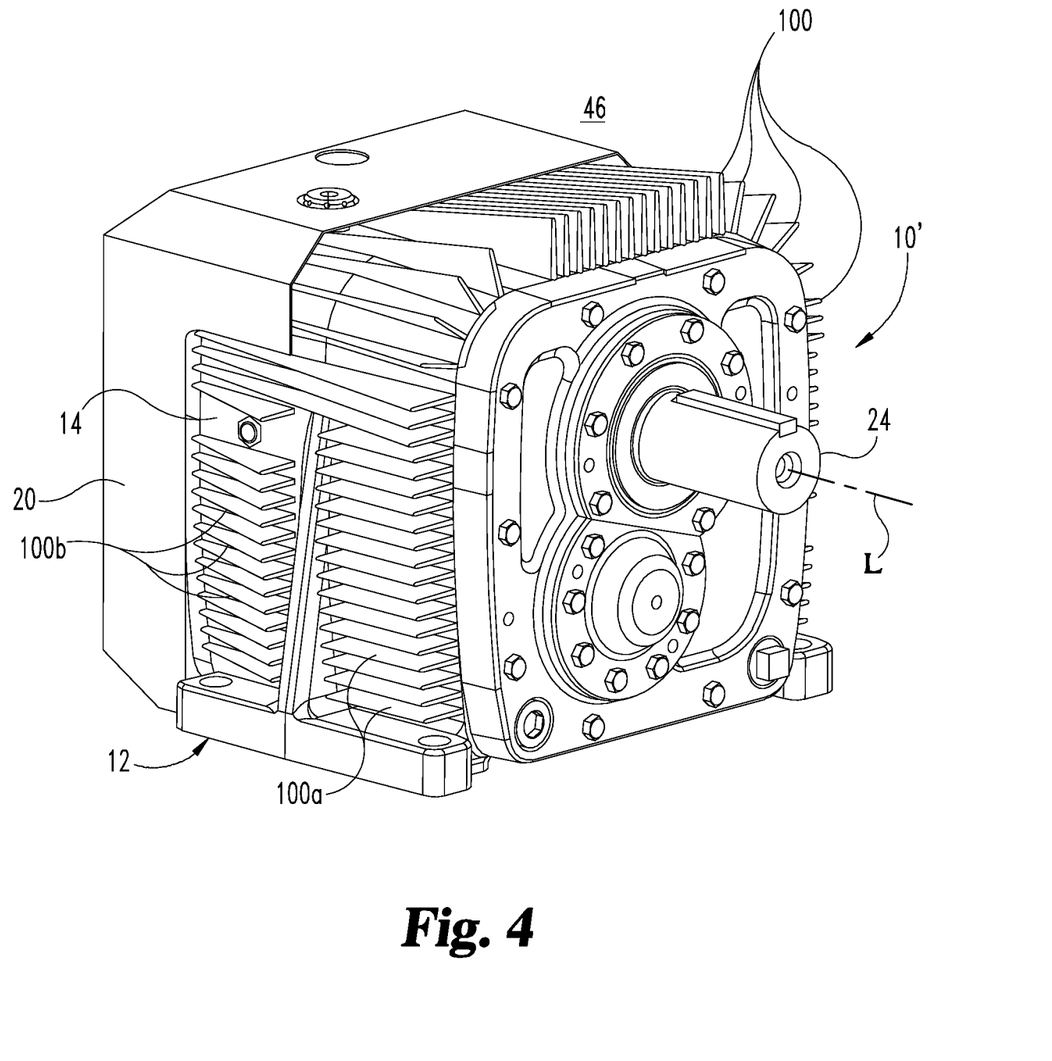
FIG. 4 is a perspective view illustrating some aspects of a speed reducer system such as shown in FIGS. 1-3 with the addition of cooling fins according to one embodiment of the present disclosure.
Figure 5:
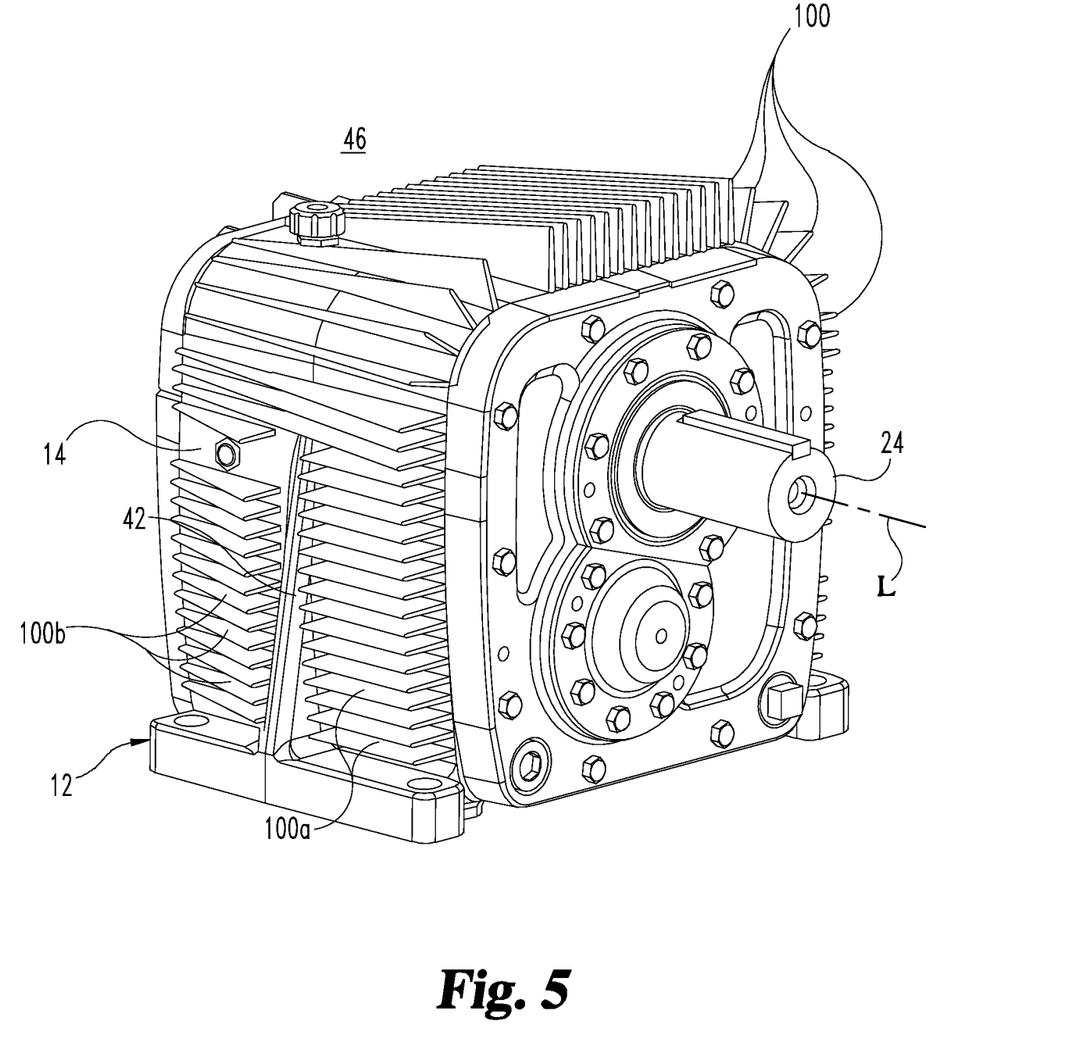
FIG. 5 is a perspective view of the speed reducer system and cooling fins of FIG. 4 with the shroud removed.
Figure 6:
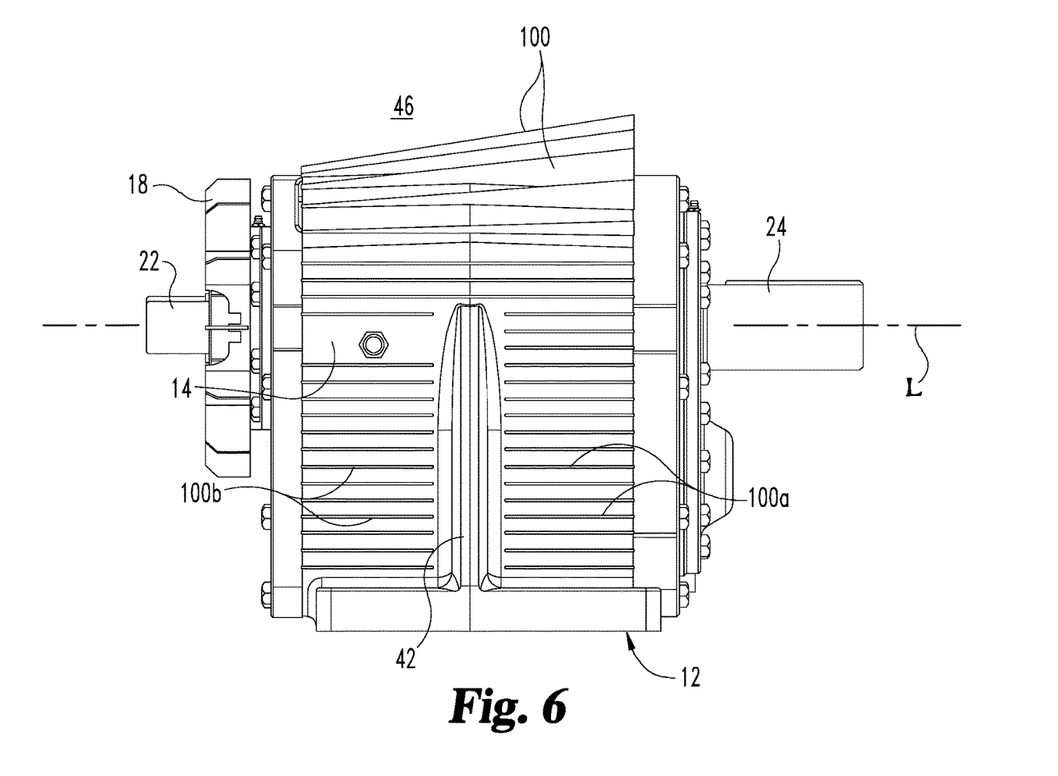
FIG. 6 is a side view of the speed reducer system and cooling fins of FIG. 5.
Figure 7:
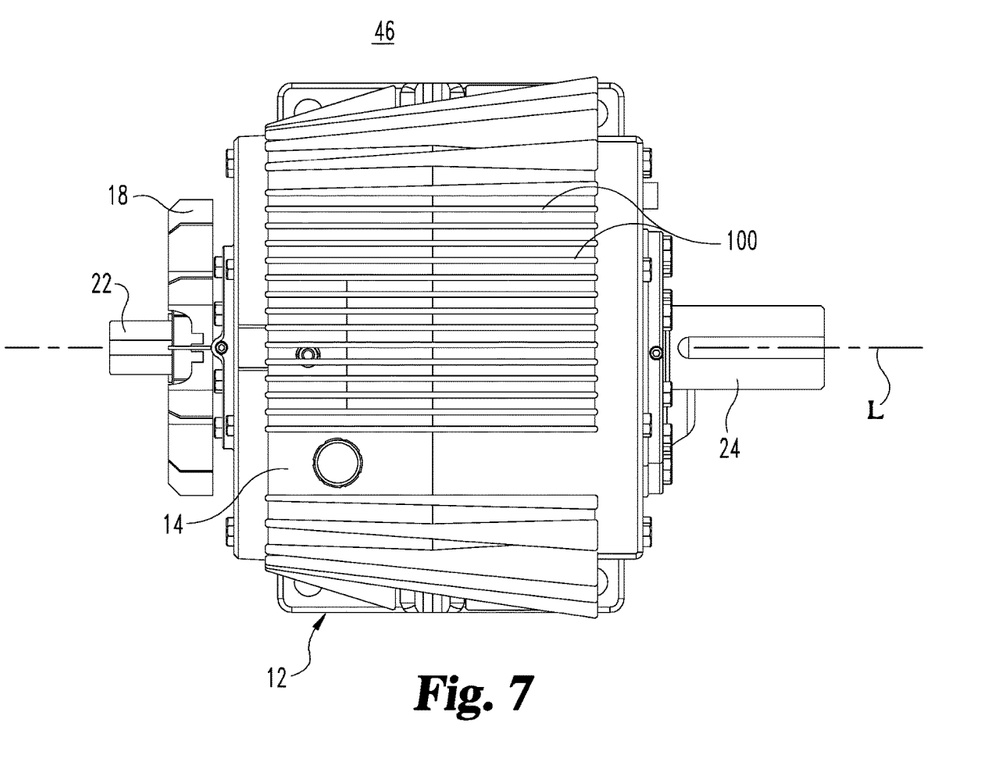
FIG. 7 is a top view of the speed reducer system and cooling fins of FIG. 5.

Speed reducer systems remain an area of interest. Referring to FIGS. 1-3, some aspects of a non-limiting example of a prior art speed reducer system 10 are illustrated. Speed reducer system 10 includes a speed reducer 12. Speed reducer 12 may be a gear reducer, i.e., a speed-reducing gearbox, or a speed-increasing gearbox, or other type of gearbox or speed reducing/increasing device. Speed reducer 12 includes a housing 14 having an outer, external surface 16, a fan or impeller 18, a shroud 20, an input shaft 22, and an output shaft 24. Housing 14 can be a cast housing, e.g., a cast iron, aluminum, or other material housing, and may be a machined or welded housing.

Outer surface 16 is employed for extracting heat from speed reducer 12 through housing 14, i.e., for cooling speed reducer 12. Outer surface 16 has a contoured shape 26. Contoured shape 26 may include a plurality of flat portions on a top wall 28, a plurality of arcuate corners 30, and a plurality of curved sidewalls 32 that may be more gently curved than corners 30. Corners 30 connect sidewalls 32 to the top wall 28.

Fan or impeller 18 is coupled to input shaft 22, and is constructed to generate a cooling airflow 34. Fan or impeller 18 may be, for example, a radial or centrifugal fan and/or an axial fan, or an impeller. Shroud 20 is constructed to direct cooling airflow 34 from fan or impeller 18 over outer surface 16 of housing 14.

Some existing systems have various shortcomings, drawbacks and disadvantages relative to certain applications. For example, in some speed reducer system configurations, cooling fins for receiving the airflow 34 are provided on housing 14 by casting the cooling fins with the speed reducer housing, or by providing add-on cooling fin assemblies that are attached to the outer surface 16 of the speed reducer housing 14 with fasteners. However, cooling fins that are cast with the housing 14 may have defects introduced by the casting process and limits the arrangement and configuration of cooling fins that can be employed. Add-on cooling fin assemblies require mounting holes on the speed reducer housing 14, and may not provide the desired fit with the various curvatures of the speed reducer housing 14. Accordingly, there remains a need for further contributions in this area of technology.

SUMMARY

One embodiment of the present disclosure is a unique speed reducer system having cooling fins formed on an outer surface of the housing of the speed reducer via a metal additive manufacturing process. Other embodiments include apparatuses, systems, devices, hardware, methods, and combinations for speed reducer systems and cooling fins. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Speed reducers and other types of gearboxes may be thermally limited, due to internal power losses (e.g., gear churning, mesh, and bearing drag losses). The internal power losses generate heat, which drives up the temperature of the speed reducer, which may adversely affect the life of the speed reducer under some conditions, and which may limit the power density of the speed reducer. In order to improve power density, e.g., of existing and of future speed reducer designs, a scheme to provide or improve speed reducer cooling may be employed.

Embodiments of the present disclosure include the use of added cooling fins 100 such as shown in FIGS. 4-7 that are formed on outer surface 16 of housing 14 of a gear reducer system 10' via a metal additive manufacturing process. Gear reducer system 10' may include features in common with gear reducer system 10, and therefore like elements are referenced with the same reference numerals. However, it should be understood that cooling fins 100 and the other cooling fin embodiments disclosed herein may be employed with any gear reducer system. Cooling fins 100 reduce the operating temperatures of speed reducer 12, which may permit speed reducer 12 to transmit more power and/or torque, and which thus may increase the power density of speed reducer 12.

Referring to FIGS. 4-7, gear reducer system 10' includes a plurality of cooling fins 100 that are added to outer surface 16 of housing 14 of speed reducer 12 via a metal additive manufacturing process. Cooling fins 100 are added to the flat upper wall portions on the top wall 28, the plurality of arcuate corners 30, and the plurality of curved sidewalls 32. The cooling fins 100 may be continuous in a direction of a longitudinal axis L defined by shafts 22, 24 on the upper wall portions of top wall 28 and corners 30. Cooling fins 100 may be segmented or interrupted into first and second portions 100a, 100b in the direction of longitudinal axis L, such as along the sidewalls 32, to accommodate flanges 42 that extend outwardly from the sidewalls 32. Cooling fins 100 may also extend in a parallel relation to longitudinal axis L and are linear or straight along their respective lengths.

Figure 8:
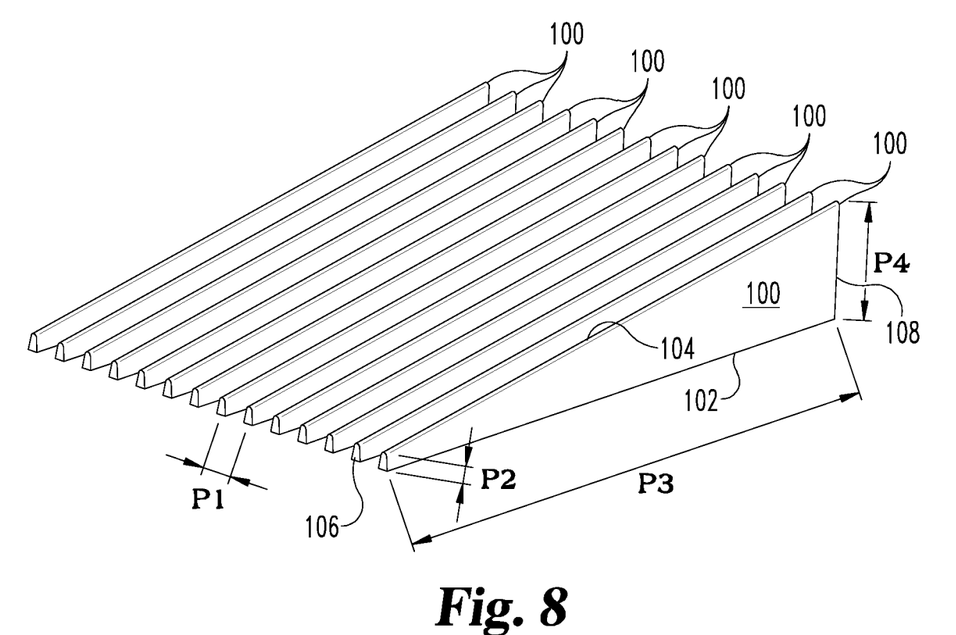
FIG. 8 is a perspective view showing dimensional parameters of cooling fins according to one embodiment of the present disclosure.

Cooling fins 100 may also be tapered in height along longitudinal axis L in a direction toward shroud 20 to allow the cooling fins 100 to fit under shroud 20. For example, as shown in FIG. 8, cooling fins 100 may each include a base 102 and an opposite outer edge 104. Base 102 and outer edge 104 extend between a first end 106 oriented toward shaft 22 and a second end 108 oriented toward shaft 24 on the housing 14. The outer edge 104 is continuously inclined or sloped along a length P3 from a first height P2 at first end 106 to a taller, increased height P4 at second end 108. Each of the longitudinally extending cooling fins 100 can also be spaced in side-by-side parallel relation to one another at a pitch P1. Non-parallel relationships between adjacent cooling fins 100 are also contemplated.

Cooling fins 100 are of a slender configuration that is unavailable with cast cooling fin configurations. Cooling fins 100 are constructed to guide the air flow created by fan 18 along outer surface 16 of housing 14 to remove heat from outer surface 16 of housing 14, and to transfer heat to the environment 46 in which speed reducer 12 is located by convection, increasing the cooling capacity of the fan 18.

Figure 9A:
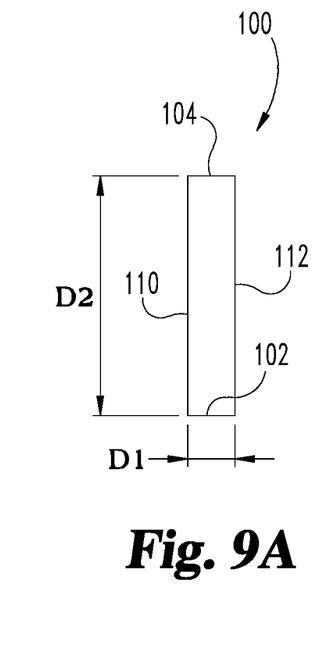
FIGS. 9A-9D are cross-sectional views showing dimensional parameters and shapes of various embodiments of cooling fins according to the present disclosure.
Figure 9B:
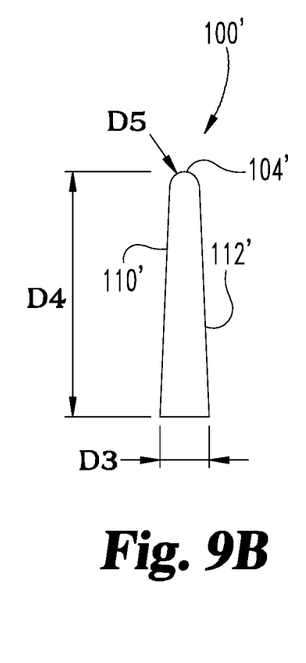

Various possible cross-sectional configurations for cooling fins 100 are contemplated, such as shown in FIGS. 9A-9D. For example, cooling fin 100 in FIG. 9A includes a rectangular cross-section with a width D1 at base 102 and a height D2 from base 102 to an outer edge 104. The side surfaces 110, 112 extending from base 102 to outer edge 104 are parallel to one another. FIG. 9B shows another embodiment of cooling fin 100 designated as 100' that includes a tapered cross-section with a rounded outer edge 104'. Cooling fin 100' includes a width D3 at base 102 and a height D4 to a center of a radius of curvature of the outer edge 104'. The outer edge 104' extends between side surfaces 110' 112' along an arc defined by a radius D5. The side surfaces 110', 112' are also sloped so that the width D3 tapers toward the outer edge 104'.

Figure 9C:
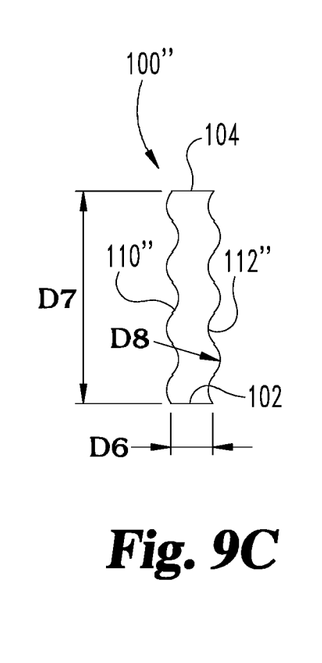
Figure 9D:
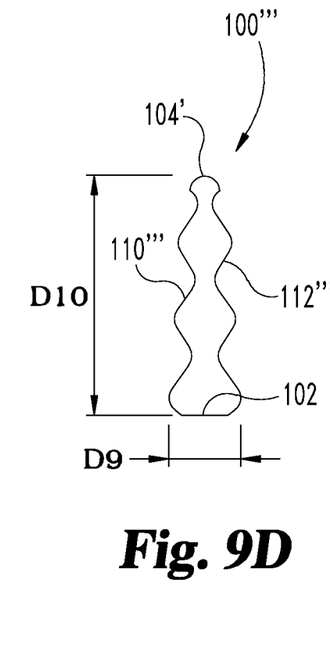
Figure 10:
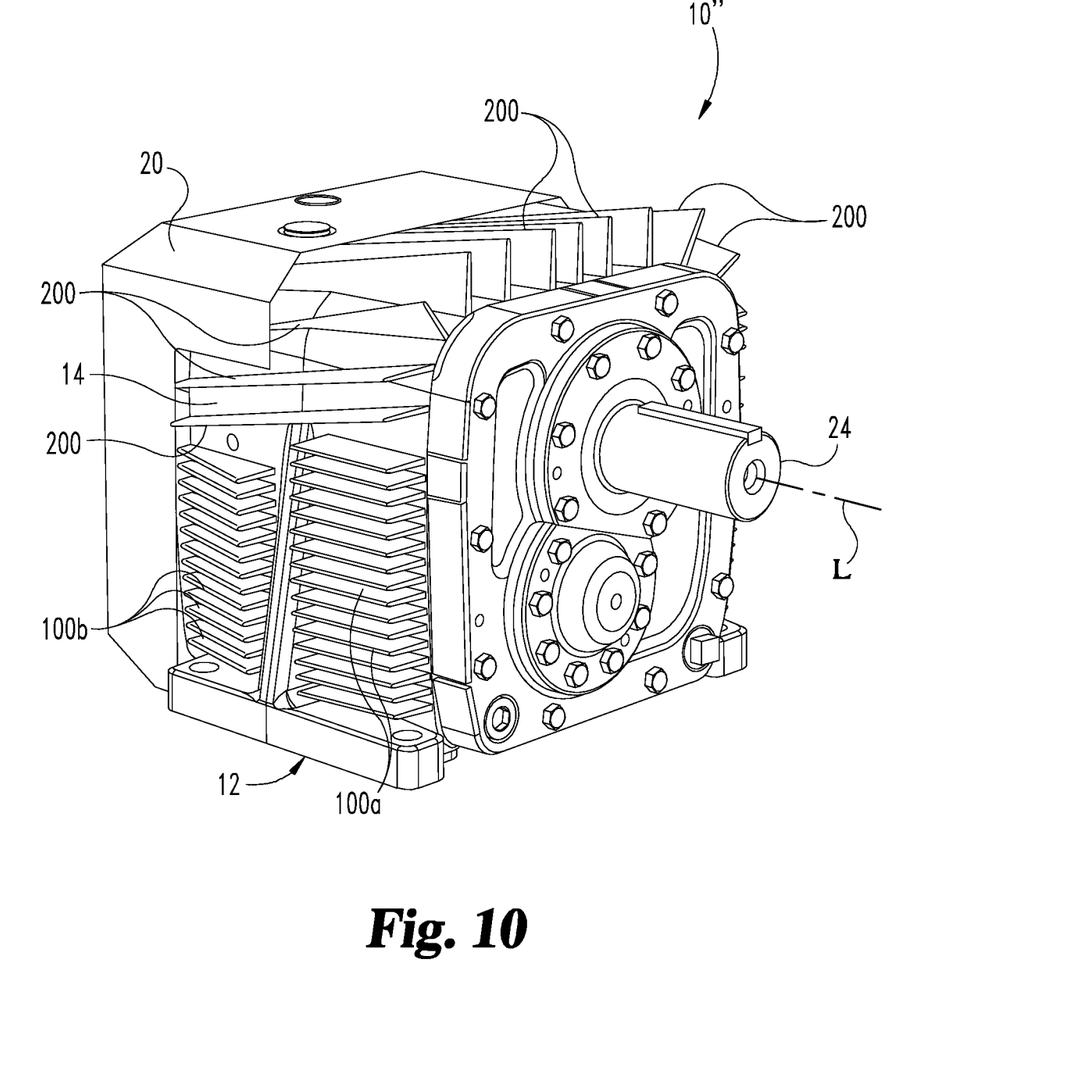
FIG. 10 is a perspective view illustrating some aspects of a speed reducer system such as shown in FIGS. 1-3 with the addition of cooling fins according to another embodiment of the present disclosure.
Figure 11:
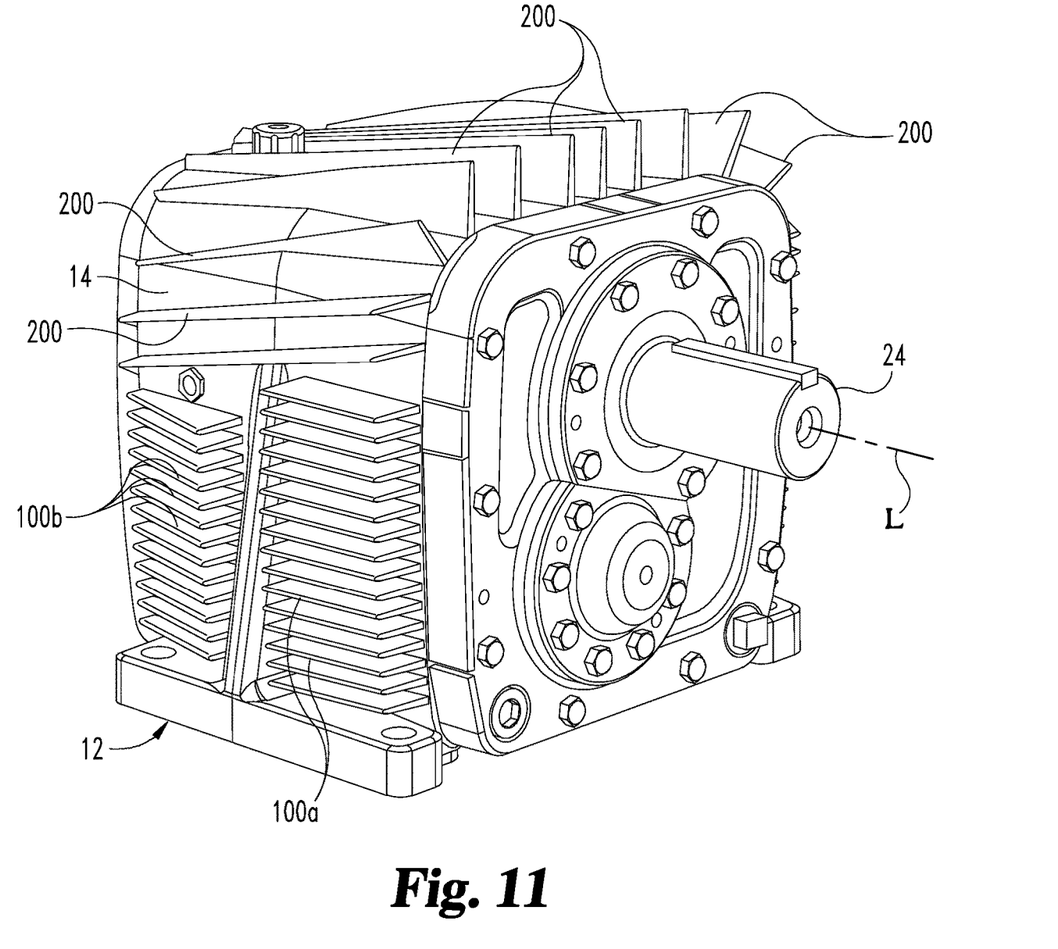
FIG. 11 is a perspective view of the speed reducer system and cooling fins of FIG. 10 with the shroud removed.
Figure 12:
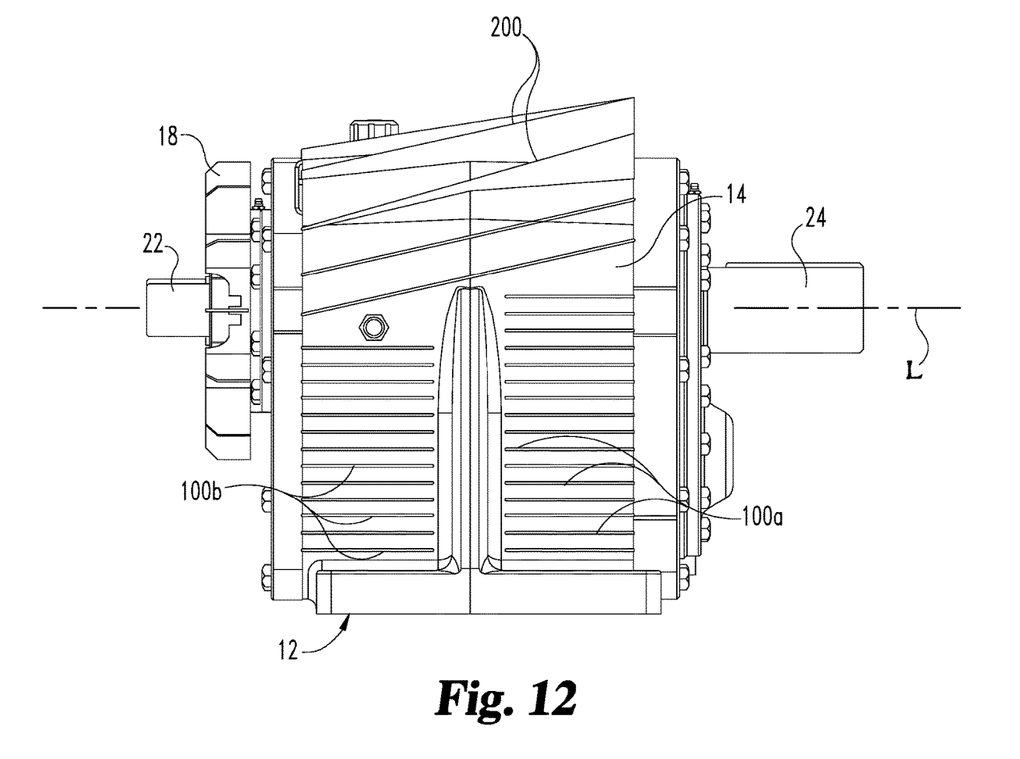
FIG. 12 is a side view of the speed reducer system and cooling fins of FIG. 10.
Figure 13:
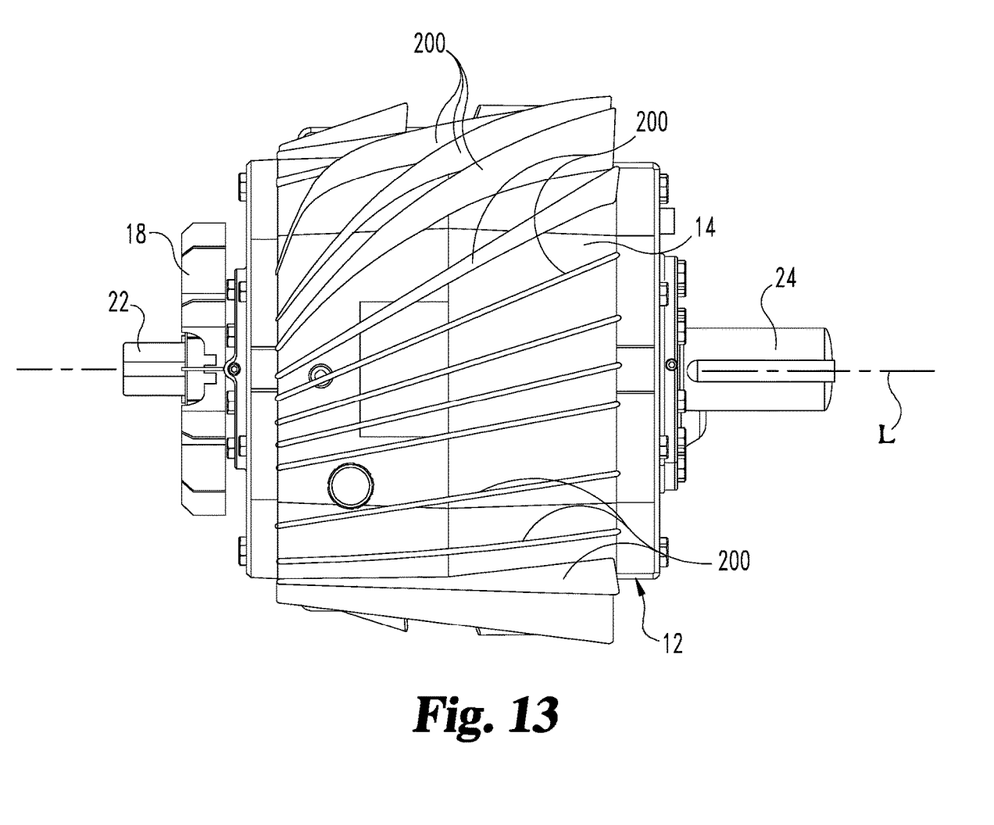
FIG. 13 is a top view of the speed reducer system and cooling fins of FIG. 10.

FIG. 9C shows another embodiment of cooling fin 100 designated as 100'' that includes a width D6 at base 102 and a height D7 from base 102 to outer edge 104. The side surfaces 110'', 112'' are serpentine shaped with a number of compound curves each defined by a curvature D8. A generally constant thickness is maintained between serpentine side surfaces 110'', 112'' between base 102 and outer edge 104. FIG. 9D shows another embodiment of cooling fin 100 designated as 100''' that has a width D9 at base 102 and a height D10 from base 102 to a rounded outer edge 104'. Side surfaces 110''', 112''' are both serpentine and tapered so that the width D9 tapers along the side surfaces 110''', 112''' toward the rounded outer edge 104'.

The cross-sections described above may be continuous along the length P3 of the respective cooling fin embodiment, or may be interrupted or vary along length P3. For example, interruptions may be provided to accommodate features of housing 14, such as flanges 42, fasteners, openings, or other structures. The cross-sections may also be provided with openings, channels, or serrations between the side surfaces to create other air flow patterns for cooling.

FIGS. 10-13 show another embodiment gear reducer system 10'' that includes cooling fins 200 that are obliquely oriented or non-parallel to longitudinal axis L to form a spirally configured orientation or configuration on housing 14 around longitudinal axis L. Cooling fins 200 can be located on top wall portions 28 and along corners 30 of housing 14. In the illustrated embodiment, the cooling fins 200 along corners 30 are curved to accommodate the curvature of the corners 30, while the cooling fins along the top wall portions 28 are linear but non-parallel to one another such that the spacing between adjacent cooling fins 200 reduces in the direction toward fan 18 and shroud 20. Segmented cooling fins 100 including portions 100a, 100b can be provided on sidewalls 32 in an arrangement where the cooling fin portions 100a, 110b are parallel to longitudinal axis L and parallel to one another.

Cooling fins 100, 200 are added to speed reducer 12 subsequent to the casting or other manufacture of housing 14, and in some embodiments, subsequent to the manufacture of speed reducer 12, via a metal additive manufacturing process. Any suitable additive manufacturing process is contemplated, including laser powder forming, fused filament fabrication, selective laser sintering, direct selective laser sintering, direct metal laser sintering, selective laser melting, electron beam sintering, electron beam melting, direct metal deposition, and any other known 3D printing process used for additive manufacturing.

The material for the metal additive manufacturing process to form the cooling fins 100, 200 disclosed herein can be any suitable metal that can provide the required heat transfer and remain solid at the operating temperature of the speed reducer system. The material can be in the form of a solid, liquid, powder, sheet, wire, filament, or any other suitable configuration for application to the outer surface 16 of housing 12. The cooling fins may be formed in whole, in part, or in combination with one or more of the following materials: pure metals, copper, copper alloys, aluminum, aluminum alloys, steel, stainless steel, magnesium, magnesium alloys, titanium, titanium alloys, cast iron, nickel alloys, and chrome alloys.

Cooling fins 100, 200 are in thermal engagement with outer surface 16, and are thermally and mechanically coupled to outer surface 16 via the metal additive manufacturing process. For example, base 102 of cooling fin 100 is in contact with outer surface 16 of housing 14 for transferring heat from housing 14 to each cooling fin 100. In some embodiments, cooling fins 100, 200 are constructed to match and engage the contoured shape 26 of housing 14. For example, base 102 of cooling fins 100, 200 may be formed to directly attach to and complement the contour of the corresponding flat wall portions of top wall 28 curved arcuate corners 30, and/or curved sidewalls 32 of housing 14, in order to maximize effective thermal contact area between cooling fins 100, 200 and housing 14. Furthermore, the dimensional parameters, configuration, spacing, and arrangement of the cooling fins 100, 200 on housing 14 can be uniquely provided for each speed reducer system design based on air flow patterns and desired cooling based on computational fluid dynamics for the speed reducer system.

During the operation of speed reducer system 10', 10", the fan or impeller 18 is rotated by shaft 22, and draws in air from the environment 46 in which speed reducer 12 is located, and generates cooling airflow 34. The air is drawn into, for example, an opening or inlet 48 in shroud 20. Shroud 20 directs cooling airflow over and/or through the cooling fins 100, 200, extracting heat from speed reducer 12 via convection. In some embodiments, cooling fins 100, 200 may be shaped to enhance airflow over and/or through cooling fins 100, 200. Some embodiments may not include a fan or impeller 18, in which case, the cooling fins 100, 200 may be shaped to promote natural convection.

Various aspects of the present disclosure are contemplated. For example, one aspect includes a method for manufacturing a speed reducer system. The method includes providing a speed reducer including an input shaft and an output shaft extending along a longitudinal axis, the speed reducer further including a housing including an outer surface; and forming a plurality of cooling fins via a metal additive manufacturing process directly on the outer surface of the housing, where with the housing secured to the speed reducer the cooling fins extend along the longitudinal axis and are configured to transfer heat to an environment in which the speed reducer is located by convection.

In one embodiment, the outer surface has a contoured shape, and the plurality of cooling fins are formed on the contoured shape of the outer surface. In another embodiment, the plurality of cooling fins are formed on the housing to extend parallel to the longitudinal axis. In yet another embodiment, the plurality of cooling fins are formed one the housing to extend obliquely to the longitudinal axis.

In still another embodiment, the plurality of cooling fins are formed to define a height extending from the outer surface of the housing, and the cooling fins are each tapered in height along the longitudinal axis from a first end of the cooling fins located toward the input shaft to a second end of the cooling fins located toward output shaft. In a refinement of this embodiment, the speed reducer includes a fan on the input shaft and the method includes mounting a shroud around the fan so the shroud is positioned around the second end of the cooling fins formed on the outer surface of the housing.

In another embodiment, the method includes determining a plurality of dimensional parameters for each of the plurality of cooling fins; and forming each of the plurality of cooling fins based on the plurality of dimensional parameters.

In yet another embodiment, a first portion the plurality of cooling fins are formed on the housing in a spiral shape around the longitudinal axis. In a refinement of this embodiment, the outer surface of the housing includes first and second arcuate corners and the spirally shaped cooling fins are located on each of the first and second arcuate corners of the housing. In a further refinement, a second portion of the cooling fins are formed on the housing in a linear and oblique orientation to the longitudinal axis, the second portion of the cooling fins being located on a top wall of the housing between the spirally shaped cooling fins at the first and second corners of the housing. In yet a further refinement, a third portion of the cooling fins are linear and parallel to the longitudinal axis, and are formed along opposite sidewalls of the housing.

In another embodiment, the cooling fins are formed at least in part from one or more metal materials selected from the group consisting of: pure metals, copper, copper alloys, aluminum, aluminum alloys, steel, stainless steel, magnesium, magnesium alloys, titanium, titanium alloys, cast iron, nickel allows, and chrome alloys. In yet another embodiment, the metal additive manufacturing process is selected from the group consisting of: laser powder forming, fused filament fabrication, selective laser sintering, direct selective laser sintering, direct metal laser sintering, selective laser melting, electron beam sintering, electron beam melting, and direct metal deposition.

In another embodiment, at least one of the cooling fins includes a cross-section defined by a base and an outer edge opposite the base, and opposite side surfaces defining a width that extends from the base to the outer edge. In one refinement, the width tapers from the base toward the outer edge. In another refinement, the outer edge is rounded between the opposite side surfaces. In yet another refinement, the side surfaces are serpentine.

According to another aspect of the present disclosure, a speed reducer system includes a speed reducer having a housing and a shaft extending from the housing along a longitudinal axis. The housing includes an outer surface along a top wall, opposite sidewalls, and corners connecting the opposite sidewall to the top wall. A fan or impeller is coupled to the shaft and constructed to generate a cooling airflow. A plurality of cooling fins on the outer surface of the housing extend along the longitudinal axis. The plurality of cooling fins are obliquely oriented to the longitudinal axis along the top wall and corners.

In one embodiment of the speed reducer system, the plurality of cooling fins are spirally oriented around the longitudinal axis along the corners. In a refinement of this embodiment, the plurality of cooling fins are linear along the top wall. In another refinement, the plurality of cooling fins are non-parallel along the top wall. In a further refinement, the plurality of cooling fins along the opposite sidewalls are parallel to the longitudinal axis.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for manufacturing a speed reducer system, comprising:
providing a speed reducer including an input shaft and an output shaft extending along a longitudinal axis, the speed reducer further including a housing including an outer surface; and
forming a plurality of cooling fins via a metal additive manufacturing process directly on the outer surface of the housing after casting or other manufacture of the housing, wherein with the housing secured to the speed reducer the cooling fins extend along the longitudinal axis and are configured to transfer heat to an environment in which the speed reducer is located by convection.

2. The method of claim 1, wherein the outer surface has a contoured shape, and the plurality of cooling fins are formed on the contoured shape of the outer surface.

3. The method of claim 1, wherein the plurality of cooling fins are formed on the housing to extend parallel to the longitudinal axis.

4. The method of claim 1, wherein the plurality of cooling fins are formed on the housing to extend obliquely to the longitudinal axis.

5. The method of claim 1, wherein the plurality of cooling fins are formed to define a height extending from the outer surface of the housing, and the cooling fins are each tapered in height along the longitudinal axis from a second end of the cooling fins located toward the output shaft to a first end of the cooling fins located toward the input shaft.

6. The method of claim 5, further comprising a fan on the input shaft and further comprising mounting a shroud around the fan so the shroud is positioned around the first end of the cooling fins formed on the outer surface of the housing.

7. The method of claim 1, further comprising:
determining a plurality of dimensional parameters for each of the plurality of cooling fins; and
forming each of the plurality of cooling fins based on the plurality of dimensional parameters.

8. The method of claim 1, wherein a first portion of the plurality of cooling fins are formed on the housing in a spiral shape around the longitudinal axis.

9. The method of claim 8, wherein the outer surface of the housing includes first and second arcuate corners and the spirally shaped cooling fins are located on each of the first and second arcuate corners of the housing.

10. The method of claim 9, wherein a second portion of the cooling fins are formed on the housing in a linear and oblique orientation to the longitudinal axis, the second portion of the cooling fins being located on a top wall of the housing between the spirally shaped cooling fins at the first and second corners of the housing.

11. The method of claim 10, wherein a third portion of the cooling fins are linear and parallel to the longitudinal axis, and are formed along opposite sidewalls of the housing.

12. The method of claim 1, wherein the cooling fins are formed at least in part from one or more metal materials selected from the group consisting of: pure metals, copper, copper alloys, aluminum, aluminum alloys, steel, stainless steel, magnesium, magnesium alloys, titanium, titanium alloys, cast iron, nickel allows, and chrome alloys.

13. The method of claim 1, wherein the metal additive manufacturing process is selected from the group consisting of: laser powder forming, fused filament fabrication, selective laser sintering, direct selective laser sintering, direct metal laser sintering, selective laser melting, electron beam sintering, electron beam melting, and direct metal deposition.

14. The method of claim 1, wherein at least one of the cooling fins includes a cross-section defined by a base and an outer edge opposite the base, and opposite side surfaces defining a width that extends from the base to the outer edge.

15. The method of claim 14, wherein the side surfaces are serpentine.

16. The method of claim 1, wherein the housing includes a top wall, opposite sidewalls, and corners connecting the opposite sidewall to the top wall, and the plurality of cooling fins are formed on the outer surface of the housing so as to extend along the longitudinal axis in an oblique orientation to the longitudinal axis along the top wall and corners.

17. A method for manufacturing a speed reducer system, comprising:
providing a speed reducer including an input shaft and an output shaft extending along a longitudinal axis, the speed reducer further including a housing including an outer surface; and
forming a plurality of cooling fins via a metal additive manufacturing process directly on the outer surface of the housing, wherein with the housing secured to the speed reducer the cooling fins extend along the longitudinal axis and are configured to transfer heat to an environment in which the speed reducer is located by convection, wherein at least one of the cooling fins includes a cross-section defined by a base and an outer edge opposite the base, and opposite side surfaces defining a width that extends from the base to the outer edge and the width tapers from the base toward the outer edge.

18. The method of claim 17, wherein the outer edge is rounded between the opposite side surfaces.

19. The method of claim 18, wherein the side surfaces are serpentine.

20. The method of claim 17, wherein the side surfaces are serpentine.

21. A method for manufacturing a speed reducer system, comprising:
providing a speed reducer including an input shaft and an output shaft extending along a longitudinal axis, the speed reducer further including a housing including an outer surface, wherein the housing includes a top wall, opposite sidewalls, and corners connecting the opposite sidewall to the top wall; and
forming a plurality of cooling fins via a metal additive manufacturing process directly on the outer surface of the housing, wherein with the housing secured to the speed reducer the cooling fins extend along the longitudinal axis and are configured to transfer heat to an environment in which the speed reducer is located by convection, wherein the plurality of cooling fins are formed on the outer surface of the housing so as to extend along the longitudinal axis in an oblique orientation to the longitudinal axis along the top wall and corners and the plurality of cooling fins are spirally oriented around the longitudinal axis along the corners.

22. The speed reducer system of claim 21, wherein the plurality of cooling fins are linear along the top wall.

23. The speed reducer system of claim 22, wherein the plurality of cooling fins are non-parallel along the top wall.

24. The speed reducer system of claim 23, wherein the plurality of cooling fins along the opposite sidewalls are parallel to the longitudinal axis.

\* \* \* \* \*